United States Patent [19]

Bray

[11] 3,858,108

[45] Dec. 31, 1974

[54] GENERATOR CONTROL CIRCUITS

[75] Inventor: Arnold Bray, Hertfordshire, England

[73] Assignee: Lucas Aerospace Limited, Birmingham, England

[22] Filed: May 25, 1973

[21] Appl. No.: 363,830

[30] Foreign Application Priority Data

May 25, 1972 Great Britain .................... 24666/72

[52] U.S. Cl. ......................... 322/28, 322/73, 307/84

[51] Int. Cl. ................................................ H02p 9/30

[58] Field of Search .................... 322/28, 33, 44, 73; 320/39, 40, 64, 68; 307/84

[56] References Cited

UNITED STATES PATENTS

| | | | |
|---|---|---|---|
| 3,602,796 | 8/1971 | Blcher | 322/28 |
| 3,631,258 | 12/1971 | Eisenstadt | 322/28 X |
| 3,818,319 | 6/1974 | Harrell et al. | 322/28 |

*Primary Examiner*—J. D. Miller

*Assistant Examiner*—Robert J. Hickey

*Attorney, Agent, or Firm*—Holman & Stern

[57] ABSTRACT

A generator control circuit comprises means for varying the field current in the generator, a differential amplifier for providing a control signal to said means and the differential amplifier having a pair of inputs. One input is connected to a reference voltage whilst the other input is supplied with a voltage which is proportional to the actual output voltage of the generator and super-imposed on this voltage is a saw tooth voltage which is produced by a saw tooth generator whereby the output of the amplifier will be a pulse width modulated wave train which acts as a control signal for said means.

6 Claims, 3 Drawing Figures

GENERATOR CONTROL CIRCUITS

This invention relates to generator control circuits and has for its object to provide such a circuit in a simple and convenient form.

A circuit in accordance with the invention comprises in combination, means for varying the field current in said generator, a differential amplifier for providing a control signal to said means, said differential amplifier having a pair of inputs one of which is connected to a reference voltage, means for applying a signal voltage which is a proportion of the actual output voltage of said generator to said other input terminal, a sawtooth generator for providing a sawtooth voltage which is also applied to said other input terminal whereby the output of the amplifier will be a pulse width modulated wave train which acts as a control signal for said means.

The invention also resides in generation systems including a plurality of such control circuits together with the associated generators, the control circuits including means for varying the voltages applied to said one input terminals of the differential amplifiers in accordance with the unbalance of current supplied by the generators thereby to reduce the out of balance of the current supplied by the generators.

One example of a generator control circuit in accordance with the invention will now be described with reference to the accompanying drawings in which.

Figure 1:
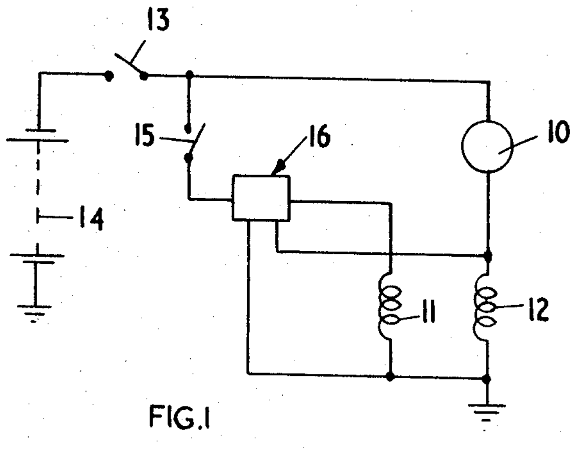
FIG. 1 shows the basic layout of the system.

Referring to FIG. 1 of the drawings the generator includes an armature 10 and a field system which includes a shunt field winding 11 and an interpole winding 12. The current flowing in the armature 10 also flows in the interpole winding 12 and this current is delivered by way of a contactor 13 to an accumulator 14 across which may be connected to a load not shown. One end of the field winding 11 is earthed and the other end of the winding is connected to the generator control circuit shown as a block at 16, and this through a switch 15, is connected to a point intermediate the contactor 13 and the armature 10.

Figure 3:
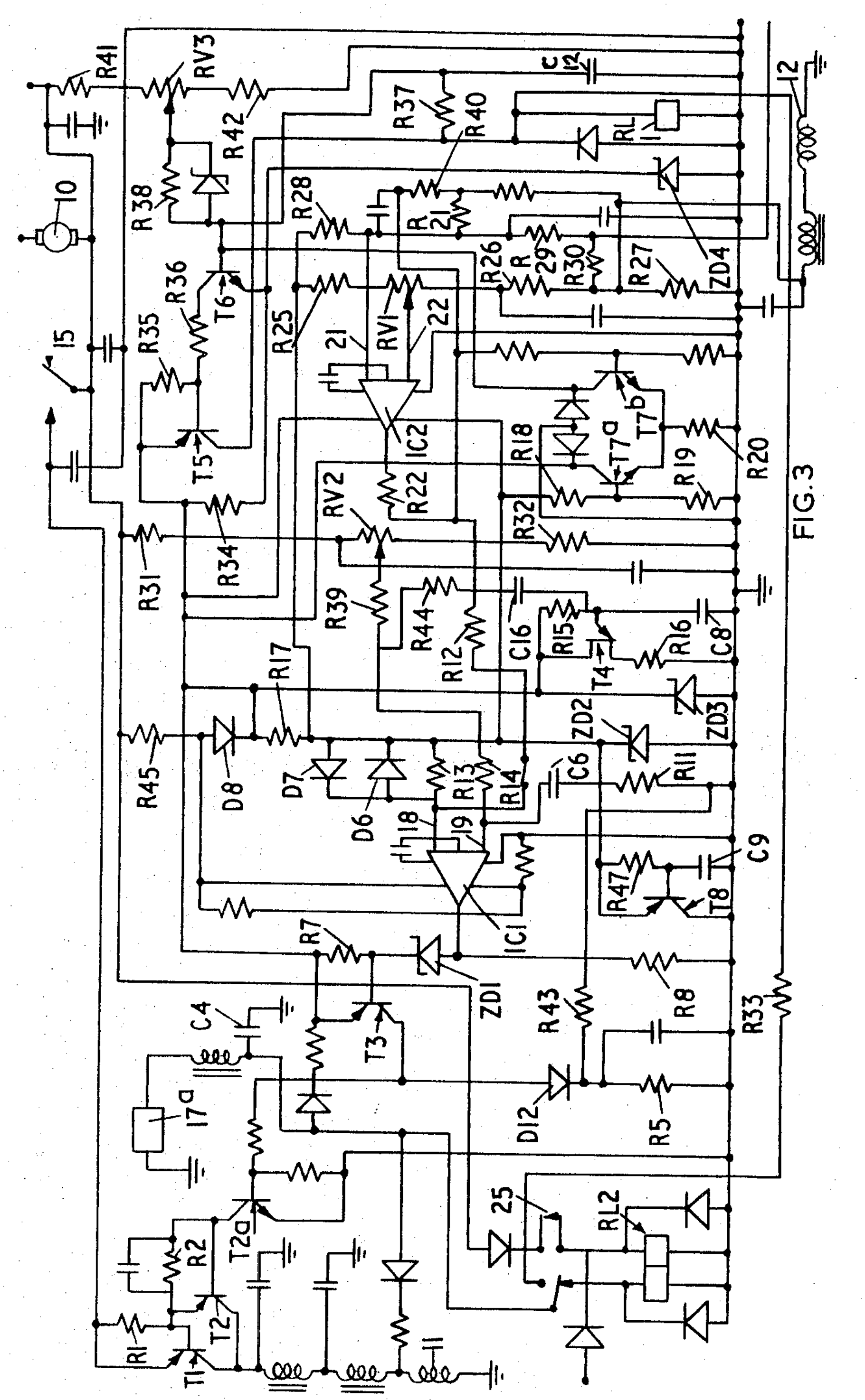
FIG. 3 shows in greater detail the generator control circuit.

With reference now to FIG. 3 of the drawings the switch 15 is shown as the contacts of a latched relay RL2 and connected intermediate the contacts 15 and the field winding 11 of the generator is the emitter collector circuit of a p-n-p transistor T1, which is switched on and off to vary the mean current flowing in the field winding 11. The base of transistor T1 is connected to the emitter of a p-n-p transistor T2 and the collector of this transistor is connected to the collector of transistor T1. In addition the base of transistor T1 is connected to its emitter by way of resistor R1. The base of transistor T1 is also connected to one end of resistor R2 and the other end of resistor R2 is connected to the collector of an n-p-n transistor T2*a* the emitter of which is connected to an earth line. The base of transistor T2*a* is connected by a resistor to its emitter and through a further resistor to one end of a resistor R5 by way of a diode D12. The other end of the resistor R5 is connected to the aforesaid earth line.

Also provided is a supply line 17 which is connected to a positive source of supply **17*a* and the negative terminal of this supply is connected to the aforesaid earth line. The one end of resistor R5 is connected by way of the diode 12 and the collector emitter path of a p-n-p transistor T3 to the line 17 and the base of transistor T3 is connected by way of resistor R7 to the line 17. In addition the base of transistor T3 is connected to the cathode of a Zener diode Zd1 the anode of which is connected by way of resistor R8 to the earth line. Moreover, the anode of Zener diode ZD1 is connected to the output terminal of an integrated circuit differential amplifier IC1. This amplifier has a pair of input terminals referenced 18 and 19 the first of which is connected by way of resistor R13 to the cathode of a Zener diode ZD2 the anode of which is connected to the earth line. In addition the cathode of Zener diode ZD2 is connected by way of resistor R17, diode D8 and resistor R45 to a line 20 which is connected to the armature 10 of the generator. The Zener diode ZD2 provides a stabilized supply or reference voltage to the input terminal 18**. Morever, resistor R13 is bridged by diodes D6 and D7 and connected in parallel and in back to back relationship so that the voltage excursion across resistor R13 is limited.

The other input terminal 19 of the amplifier is connected by way of resistors resistors and R39 in series to the slider of a potentiometer RV2. One end of the resistance element of the potentiometer RV2 is connected by way of resistor R32 to the earth line and the other end of the resistance element is connected by way of resistor R31 to the armature of the generator. In this manner and by adjustment of potentiometer RV2 a predetermined proportion of the output voltage of the generator is applied to the terminal 19. Line 17 is connected to a point intermediate diode D8 and resistor R17 and also to the cathode of a Zener diode ZD3. The anode of this Zener diode is connected to the earth line. The Zener diode ZD3 provides a stabilized voltage for a sawtooth oscillator constituted by uni-junction transistor T4, resistors R15 and R16 and capacitor C8. The output of the sawtooth oscillator is taken by way of capacitor C16 and resistor R44 in series, to a point intermediate resistors R14 and R39. In this manner the terminal 19 of the differential amplifier IC1 is supplied with a sawtooth voltage which is impressed upon the voltage which is derived from the slider of potentiometer RV2. In addition, the Zener diode ZD3 provides a stabilized supply for other items of the circuit which are connected to line 17.

The input terminal 18 of the differential amplifier IC1 is connected to the output terminal of a further differential amplifier IC2 by way of resistors R12 and R22 connected in series. The differential amplifier IC2 has a pair of input terminals 21 and 22, terminal 22 being connected to the slider of a potentiometer RV1 one end of the resistance element of which is connected by way of resistor R25 to a point intermediate resistor R17 and the cathode of Zener diode ZD2. The other end of the resistance element of potentiometer RV1 is connected by way of resistors R26 and R27 in series, to the earth line. The input terminal 21 of the differential amplifier IC2 is connected by way of resistor R28 to a point intermediate resistors R17 and R25 and by way of resistors R29 and R30 in series to a point intermediate resistors R26 and R27. In addition the input terminal 21 is connected to one end of a resistor 21 the other end of which is connected to a point intermediate a pair of resistors R40 and R46. The other end of resistor R40 is connected to a point intermediate resistors R12 and R22 and the other end of resistor R46 is connected to a point intermediate resistors R26 and R27.

Figure 2:
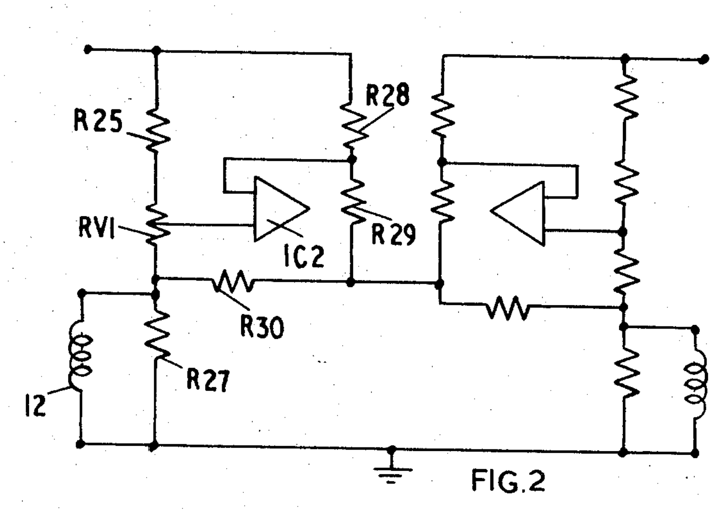
FIG. 2 shows a portion of the circuit which is shown in FIG. 3 and showing the interconnection between the two control circuits of a pair of generators respectively.

With reference now to FIG. 2 the portion of the circuit which is assigned reference numerals represents the latter portion of the circuit described above whilst the other portion of the circuit which has no reference numerals is identical and forms a portion of a control circuit of another generator. In particular it will be noted that points intermediate resistors R29 and R30 in the two circuits are interconnected and also that the interpole winding 12 is connected in paallel with resistor R27.

The operation of the circuit so far described will now be explained and considering firstly the control of the output voltage of the generator. A proportion of the generator output voltage is applied to terminal 19 of the differential amplifier IC1 whilst a reference voltage is applied to the terminal 18 moreover, superimposed on the voltage applied to terminal 19 is the sawtooth voltage which is developed by the sawtooth oscillator comprising uni-junction transistor T4. The output voltage of the differential amplifier IC1 is in the form of a pulse width modulated square wave, the pulse width varying in accordance with the variation of the generator voltage. The output from the differential amplifier IC1 is applied to transistor T3 which together with transistors T2*a*, T2 and T1 constitute a means for varying the mean field current of the generator. The square wave output is applied to transistor T3 which inverts and amplifies the voltage signal before it is passed to the chain of transistors T2*a*, T2 and T1. In the event that the output voltage of the generator exceeds the desired value then the mean field current is reduced so that the generator voltage falls and vice versa.

The differential amplifier IC2 together with the attendant circuitry is used to achieve a balanced output when two generators are connected in parallel. The current which is being supplied by each generator is detected by measuring the voltage across the interpole winding 12 and as will be appreciated from FIG. 2 if the current flowing from each generator is equal, there will be no current flow in the resistors R30 of the two control circuits due to the voltages developed across the interpoles. If however, the current flow in the two generators should differ then current flow due to this variation will occur in the two resistors R30. The voltage developed across the two resistors R30 due to the current difference will be the same but of opposite polarity with respect to the associated amplifier input. Under balanced conditions the potentials of the inputs 21 and 22 are pre-set by potentiometer RV1 such that the output of amplifier IC2 is equal to the reference voltage of Zener diode ZD2 but in the event that the current flow in the resistor R30 should vary one way or the other as a result of unequal load sharing an output will be obtained from the differential amplifier IC2 and this output modifies the input voltage applied to the input terminal 18 of the differential amplifier IC1. This has the effect of adjusting slightly the apparent reference voltage which is applied to the input terminal 18 and the overall effect is to increase slightly the field current which is applied to the generator which is delivering the lower current. In like manner the generator which is delivering the higher current will have its mean field current decreased thereby to achieve balance of the current supplied by the two generators. The arrangement described therefore maintains accurate control of the generated voltage and the load current is shared between the two generators. Moreover, by appropriate connection more than two generators can be arranged to provide load sharing.

Under fault conditions for instance when one generator is faulty it is possible that one generator will supply considerably more current than the other. In this case the output of differential amplifier IC2 will deviate more than one would normally expect but providing the generated current unbalance does not vary outside a limiting value this condition is acceptable. The degree of variation of the input voltage applied to terminal 18 of amplifier IC1 is limited by the diodes D7 and D6 so that the voltage at the input terminal 18 of amplifier IC1 will not vary from the Zener voltage of Zener diode ZD2 by more than the forward volt drop of either diode D7 or diode D6. When one of the diodes D6 or D7 is conducting the generator associated with amplifier IC1 will experience either an increased excitation or a decreased excitation, in the former case the generator supplying substantially all of the current of the system. In this condition it is possible for the output voltage of the faulty generator to fall below a certain value such that reverse current flow occurs into this generator and in this event a reverse current cut-out associated with the faulty generator will disconnect same from the main bus bar.

In addition to the control of the voltage and the provision of load sharing of a pair of generators, the circuit shown in FIG. 3 also includes an over voltage protection circuit which senses the voltage at the output of the generator. A proportion of this voltage is obtained by means of a potentiometer chain comprising resistors R41 potentiometer RV3 and resistor R42. The slider of the potentiometer is connected by way of resistor R38 to the base of an n-p-n transistor T6 and the collector of this transistor is connected by way of resistors R36 and R35 in series, to line 17. In addition a p-n-p transistor T5 is provided along its emitter connected to line 17 and its base connected to a point intermediate resistors R35 and R36. The collector of this transistor is connected to one end of the operating coil of a relay RL1 the other end of which is connected to the earth line and in addition the collector of transistor T5 is connected to the base of transistor T6 by way of resistor R37. A capacitor C12 is connected between the base of transistor T6 and the earth line. Moreover, the emitter of transistor T6 is connected to a reference voltage which is provided by resistor R34 and Zener diode ZD4 connected in series between line 17 and the earth line. Relay RL1 has a pair of normally open contacts 25 which are connected in series with the "off" coil of relay RL2. In the event that contacts 25 are closed then the switch 15 is opened to disconnect the field winding of the generator from its source of supply. The capacitor C12 eliminates the effect of high voltage low energy surges due to normal switch of loads.

It is necessary in a multi generator system to prevent (during an overvoltage condition,) the operation of the switch 15 of the generator which is operating satisfactorily and for this purpose an overvoltage discriminator is provided. This comprises a pair of n-p-n transistors T7A and T7B. The base of transistor T7A is connected to a potentiometer chain consisting of resistors R18 and R19 which is connected across Zener diode ZD2 whilst the base of transistor T7B is supplied with a voltage which is a proportion of the output voltage of differential amplifier IC2. This voltage is derived from a point intermediate resistors R12 and R22. The emitters of transistors T7A and T7B are connected together to the earth line by way of resistor R20 and the collector of transistor T7A is connected to line 17. The collector of transistor T7B is connected to the base of transistor T6. When the associated generator is operating correctly the faulty generator will supply an excessive proportion of the load current and the resultant signal across R30 will cause the output voltage obtained from amplifier IC2 to clamp by reason of the connection of transistors T7A and T7B, the base voltage of transistor T6 so that this is inoperative to sense overvoltage conditions. As a result the faulty generator is switched off whilst the associated generator continues full operation without interruption.

When an overvoltage surge is detected relay RL1 will operate to close contacts 25 and this in turn will energise the "off" coil of relay RL2. Moreover, by way of resistor R33 the "off" coil of the relay remains energised so long as the surge is present. This relay is of the latching variety so that it will stay in this position even in the event that the voltage surge disappears. In order to re-set relay RL2 when the surge has disappeared, the "on" coil of the relay is energised from an external source and this has the effect of closing switch 15 to restore the field current. In order to provide a steady build up of the field voltage when the circuit is re-set, Zener diode ZD2 is effectively bridge by a capacitive circuit so that the build up of the Zener voltage is comparatively slow. The capacitive circuit is provided by a p-n-p transistor T8 having its collector emitter path connected across the Zener diode ZD2 and its base terminal connected to a tapping between resistor R47 and capacitor C9 also connected across Zener diode ZD2.

It will be understood that current transformers may be utilized to provide signals indicative of the current flowing in the respective generators particularly where the latter are of the "brushless" type.

I claim:

1. A generator control circuit for use with an electrical generator of the kind having a field winding the circuit comprising means for varying the field current in said generator, a differential amplifier for providing a control signal to said means, said differential amplifier having a pair of inputs, a network connected across the output of the generator for supplying a reference voltage to one of said inputs, means for applying a signal voltage which is a proportion of the actual output voltage of said generator to said other input, a sawtooth generator for providing a sawtooth voltage which is also applied to said other input whereby the output of the amplifier will be a pulse width modulated wave train which acts as a control signal for said means, said network including a Zener diode and a capacitive circuit connected in parallel with the Zener diode to substantially limit the rate of build up of voltage across the Zener diode and thereby the reference voltage.

2. A control circuit according to claim 1 in which said capacitive circuit comprises the emitter collector path of a transistor, a capacitor controlling the conduction of said transistor, the emitter collector path presenting an initial low impedance across the Zener diode.

3. A control circuit according to claim 2 including a resistor connected intermediate the emitter and base of said transistor, said capacitor being connected intermediate the base and collector.

4. A generator system including a plurality of control circuits for controlling associated generators, each control circuit including means for varying the field current in the associated generator, a differential amplifier for providing a control signal to said means, said differential amplifier having a pair of inpupts, means for generating a reference voltage which is applied to one of said inputs, means for applying a signal voltage which is a proportion of the actual output voltage of the associated generator to said other input terminal, a sawtooth generator for providing a sawtooth voltage which is also applied to said other input terminal whereby the output of the amplifier will be a pulse width modulated wave train which acts as a control signal for said means, each control circuit including additional means for varying the voltage applied to said one input of the differential amplifier in accordance with the unbalance of current supplied by the generators thereby to achieve balance of the current supplied by the generators, said additional means including a further differential amplifier having its output connected to said one input the output level of said further differential amplifier being equal to said reference voltage under conditions of current balance, circuit means including a resistor through which flows a current dependent upon the out of balance current of the generators for controlling the relative value of the voltages applied to the inputs of said further differential amplifier, and means for limiting the deviation of the voltage applied to said one input of the first mentioned differential amplifier.

5. A control circuit according to claim 4 including a resistor in series with said means for generating the reference voltage and said one input of the first mentioned differential amplifier, the means for limiting the deviation of the voltage comprising a pair of diodes connected back to back in parallel with said resistor.

6. A system according to claim 4 including over voltage protection circuits in each of the control circuits, each of said overvoltage protection circuits being responsive to the output voltage of the respective generator, each overvoltage protection circuit including a relay operable in the event of a voltage surge at the output of the generator to disconnect the field winding of the respective generator from its source of supply, each of the control circuits including an overvoltage discriminator, means for supplying an input to said discriminator from the output of said second differential amplifier, said discriminator in the case of a condition where the respective generator is functioning correctly acting to prevent operation of the respective protection circuit.

* * * * *